(12) United States Patent
Watson et al.

(10) Patent No.: US 7,084,938 B2
(45) Date of Patent: Aug. 1, 2006

(54) NON-INVERTING TRANSFLECTIVE ASSEMBLY

(75) Inventors: Philip E. Watson, St. Paul, MN (US); Keith M. Kotchick, St. Paul, MN (US); Richard C. Allen, Lilydale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 58 days.

(21) Appl. No.: 10/919,707

(22) Filed: Aug. 17, 2004

(65) Prior Publication Data

US 2005/0073745 A1    Apr. 7, 2005

Related U.S. Application Data

(62) Division of application No. 09/968,817, filed on Oct. 1, 2001, now Pat. No. 6,985,291.

(51) Int. Cl.
G02F 1/1335 (2006.01)

(52) U.S. Cl. .............. 349/96; 349/64; 349/117

(58) Field of Classification Search .......... 349/96, 349/115, 176, 64, 112, 117; 359/485, 487, 359/488, 500, 501
See application file for complete search history.

(56) References Cited

U.S. PATENT DOCUMENTS

| | | | | |
|---|---|---|---|---|
| 3,213,753 A | 10/1965 | Rogers | ............................ | 88/65 |
| 3,914,017 A | 10/1975 | Bedell et al. | ................ | 350/154 |
| 4,084,883 A | 4/1978 | Eastman et al. | ............ | 350/152 |
| 4,133,775 A | 1/1979 | Bloom | ........................ | 252/300 |
| 4,166,871 A | 9/1979 | Schuler | ...................... | 427/163 |
| 4,521,080 A | 6/1985 | Funada et al. | ............. | 350/341 |
| 4,591,512 A | 5/1986 | Racich et al. | ............... | 427/163 |
| 4,886,332 A | 12/1989 | Wolfe | ...................... | 350/96.12 |
| 4,974,941 A | 12/1990 | Gibbons et al. | ............ | 350/349 |
| 5,032,009 A | 7/1991 | Gibbons et al. | ............ | 350/341 |
| 5,155,610 A | 10/1992 | Hikmet et al. | ................ | 359/75 |
| 5,196,953 A | 3/1993 | Yeh et al. | ..................... | 359/73 |
| 5,206,752 A | 4/1993 | Itoh et al. | ................... | 359/106 |
| 5,295,009 A * | 3/1994 | Barnik et al. | ............... | 349/115 |
| 5,389,698 A | 2/1995 | Chigrinov et al. | ........... | 522/2 |
| 5,486,884 A | 1/1996 | De Vaan | ..................... | 353/122 |
| 5,506,704 A | 4/1996 | Broer et al. | .................. | 359/63 |
| 5,583,677 A | 12/1996 | Ito et al. | ..................... | 349/118 |

(Continued)

FOREIGN PATENT DOCUMENTS

EP    0 940 705 A1    9/1999

(Continued)

OTHER PUBLICATIONS

Benecke et al., "Determination of Director Distributions in Liquid Crystal Polymer-Films by Means of Generalized Anisotropic Ellipsometry", *J. Appl. Phys.* vol. 39 pp. 525-531 (2000).

(Continued)

*Primary Examiner*—Toan Ton
*Assistant Examiner*—Tai Duong
(74) *Attorney, Agent, or Firm*—Anna Kobilansky (57) ABSTRACT

A film that includes a first reflective polarizer substantially reflecting light having a first polarization state and substantially transmitting light having a second polarization state, a polarization rotating layer or depolarizing layer (or both) positioned to receive light passing through the first reflective polarizer, and a second reflective polarizer positioned to receive light passing through the polarization rotating layer or depolarizing layer, the second reflective polarizer substantially reflecting light having a third polarization state back through the polarization rotating layer or depolarizing and substantially transmitting light having a fourth polarization state. Articles containing the film can be formed.

23 Claims, 4 Drawing Sheets

U.S. PATENT DOCUMENTS

| | | | |
|---|---|---|---|
| 5,583,679 A | 12/1996 | Ito et al. | 349/118 |
| 5,602,661 A | 2/1997 | Schadt et al. | 349/124 |
| 5,619,352 A | 4/1997 | Koch et al. | 349/89 |
| 5,635,105 A | 6/1997 | Kawata et al. | 252/299.01 |
| 5,666,223 A | 9/1997 | Bennett et al. | 359/490 |
| 5,686,979 A | 11/1997 | Weber | |
| 5,691,789 A | 11/1997 | Li et al. | 349/98 |
| 5,731,405 A | 3/1998 | Gibbons et al. | 528/353 |
| 5,751,388 A | 5/1998 | Larson | 349/96 |
| 5,783,120 A | 7/1998 | Ouderkirk et al. | 264/1.34 |
| 5,784,139 A | 7/1998 | Chigrinov et al. | 349/117 |
| 5,793,455 A | 8/1998 | Nakamura | 349/96 |
| 5,793,456 A | 8/1998 | Broer et al. | 349/98 |
| 5,798,808 A | 8/1998 | Van Haaren et al. | 349/96 |
| 5,807,498 A | 9/1998 | Gibbons et al. | 252/299.4 |
| 5,817,743 A | 10/1998 | Gibbons et al. | 528/353 |
| 5,825,542 A | 10/1998 | Cobb, Jr. et al. | 359/487 |
| 5,825,543 A | 10/1998 | Ouderkirk et al. | 359/494 |
| 5,838,407 A | 11/1998 | Chigrinov et al. | 349/187 |
| 5,867,316 A | 2/1999 | Carlson et al. | 359/500 |
| 5,882,774 A | 3/1999 | Jonza et al. | 428/212 |
| 5,917,664 A | 6/1999 | O'Neill et al. | 359/831 |
| 5,929,201 A | 7/1999 | Gibbons et al. | 528/353 |
| 5,932,626 A | 8/1999 | Fong et al. | 522/182 |
| 5,940,211 A | 8/1999 | Hikmet et al. | 359/490 |
| 5,946,064 A | 8/1999 | Lee | 349/124 |
| 5,958,292 A | 9/1999 | Gibbons et al. | 252/299.4 |
| 5,958,293 A | 9/1999 | Gibbons et al. | 252/299.4 |
| 5,965,247 A | 10/1999 | Jonza et al. | 428/212 |
| 5,965,691 A | 10/1999 | Gibbons et al. | 528/353 |
| 5,978,055 A | 11/1999 | Van DeWitte et al. | 349/119 |
| 5,986,734 A | 11/1999 | Winker et al. | 349/123 |
| 5,995,184 A | 11/1999 | Chung et al. | 349/118 |
| 6,001,277 A | 12/1999 | Ichimura et al. | 252/299.4 |
| 6,043,337 A | 3/2000 | Gibbons et al. | 528/353 |
| 6,044,196 A | 3/2000 | Winston et al. | 385/146 |
| 6,061,113 A | 5/2000 | Kawata | 349/117 |
| 6,061,138 A | 5/2000 | Gibbons et al. | 356/400 |
| 6,064,457 A | 5/2000 | Aminaka | 349/117 |
| 6,084,057 A | 7/2000 | Gibbons et al. | 528/353 |
| 6,088,079 A | 7/2000 | Kameyama et al. | 349/185 |
| 6,096,375 A | 8/2000 | Ouderkirk et al. | 427/163.1 |
| 6,097,461 A | 8/2000 | Sharp | 349/121 |
| 6,099,758 A | 8/2000 | Verrall et al. | 252/585 |
| 6,124,905 A | 9/2000 | Iijima | |
| 6,124,971 A | 9/2000 | Ouderkirk et al. | 349/487 |
| 6,153,272 A | 11/2000 | Kim et al. | 428/1.5 |
| 6,160,597 A | 12/2000 | Schadt et al. | 349/98 |
| 6,359,668 B1 | 3/2002 | Iijima et al. | |
| 6,379,010 B1 | 4/2002 | Suzuki et al. | |
| 6,624,936 B1 | 9/2003 | Kotchick et al. | |

FOREIGN PATENT DOCUMENTS

| | | |
|---|---|---|
| EP | 0 961 138 A1 | 12/1999 |
| JP | 2000/154261 A | 6/2000 |
| WO | WO95/17303 | 6/1995 |
| WO | WO95/17691 | 6/1995 |
| WO | WO95/17692 | 6/1995 |
| WO | WO95/17699 | 6/1995 |
| WO | WO96/06380 | 2/1996 |
| WO | WO96/19347 | 6/1996 |
| WO | WO97/44409 | 11/1997 |
| WO | WO98/52077 | 11/1998 |
| WO | WO99/08148 | 2/1999 |
| WO | WO99/36262 | 7/1999 |
| WO | WO99/60073 | 11/1999 |
| WO | WO00/39631 | 7/2000 |
| WO | WO00/39633 | 7/2000 |
| WO | WO01/79923 | 10/2001 |

OTHER PUBLICATIONS

Chen et al., "Wide Viewing Angle Photoaligned Plastic Films for TN-LCDs" SID International Symposium (1999).

Scheffer et al., "Accurate determination of liquid-crystal tilt bias angles" *J. Appl. Phys.* vol. 48 pp. 1783-1792 (1977).

Yeh, et al., "Jones Matrix Method", *Optics of Liquid Crystal Displays- John Wiley & Sons, Inc.*, Chapter 4, pp. 103-151 (1999).

Yeh, et al., "Extended Jones Matrix Method", *Optics of Light Crystal Displays- John Wiley & Sons, Inc.*, Chapter 8, pp. 306-355 (1999).

Yeh, et al., "Optical Compensators for LCDs", *Optics of Liquid Crystal Displays- John Wiley & Sons, Inc.*, Chapter 9, pp. 357-385 (1999).

\* cited by examiner

NON-INVERTING TRANSFLECTIVE ASSEMBLY

CROSS REFERENCE TO RELATED APPLICATIONS

This application is a divisional of U.S. Ser. No. 09/968,817, filed Oct. 1, 2001 now U.S. Pat. No. 6,985,291, the disclosure of which is herein incorporated by reference.

FIELD OF THE INVENTION

The present invention relates to a multilayer optical device which includes a transflective assembly. In another aspect, the invention relates to a method of making the same.

BACKGROUND OF THE INVENTION

The physical downsizing of microprocessor based technologies has led to portable personal computers, pocket secretaries, wireless phones and pagers. All of these devices, and also other devices such as clocks, watches, calculators, etc., have the common need for a low power consumption data display screen to extend the useful working time between battery replacements or battery charges. The common Liquid Crystal Display (LCD) is often used as the display for such devices. LCDs can be classified based upon the source of illumination. Reflective displays are illuminated by ambient light that enters the display from the front. In applications where the intensity of ambient light is insufficient for viewing, supplemental lighting, such as a backlight assembly, is used to illuminate the display. Some electronic displays have been designed to use ambient light when available and backlighting only when necessary. This dual function of reflection and transmission leads to the designation, "transflective".

Figure 1A:
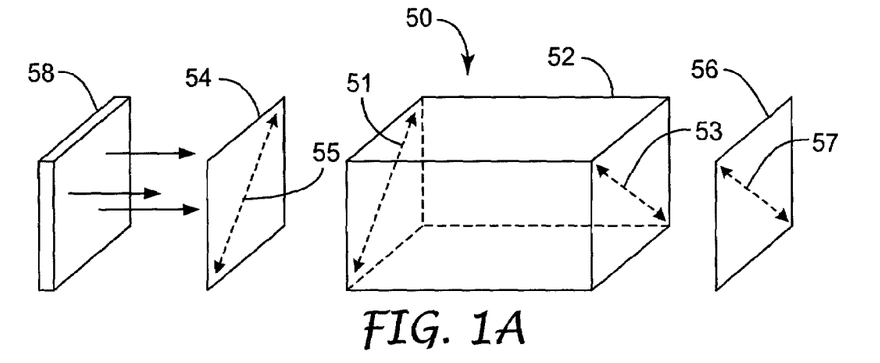
FIG. 1A is a schematic perspective view of one embodiment of a TN LCD.
Figure 1B:
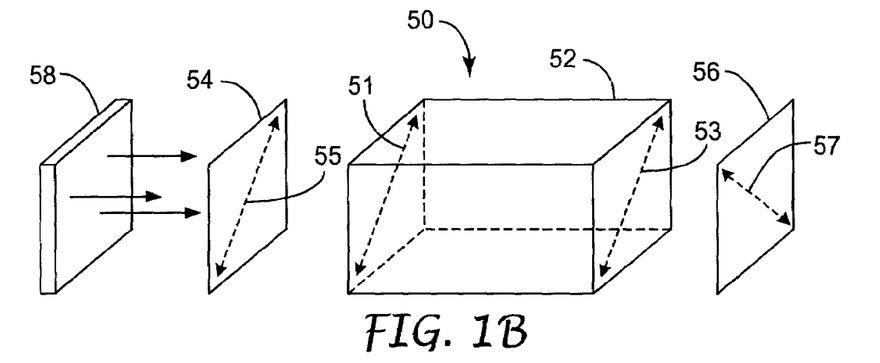
FIG. 1B is a schematic perspective view of the LCD of FIG. 1A in which a potential has been applied across the LC cell of the LCD.

A liquid crystal display (LCD) illustrates another example of the use of polarized light. FIGS. 1A and 1B schematically illustrate one example of a simple TN (twisted nematic) LCD device with E-mode transmission and normally white (NW) operation using a backlight. It will be understood that there are a variety of other LCD types and other modes of operation, as well as displays that use ambient light or a combination of a backlight and ambient light. The inventions discussed herein can be readily applied to these display types and modes of operation.

The LCD 50 of FIGS. 1A and 1B includes a liquid crystal (LC) cell 52, a polarizer 54, an analyzer 56, and a backlight 58. The arrows 55, 57 on the polarizer 54 and analyzer 56, respectively, indicate the polarization of light that is transmitted through that component. Arrows 51, 53 indicate the plane of polarization of linearly polarized light, respectively entering and exiting the LC cell 52. Additionally, the plane of the LC cell 52 containing arrows 51, 53 generally includes transparent electrodes. Light from the backlight 58 is linearly polarized by the polarizer 54. In the embodiment illustrated in FIG. 1A, in the absence of an electric potential applied across the LC cell, the director substantially lies in the plane of the display twisting uniformly through 90° along its depth. The polarized light is transmitted through the LC cell 52 where the polarization ideally rotates by 90°, with the director of the liquid crystals indicated by the arrows 51, 53. This light can then be transmitted through the analyzer 56.

An electric potential can be applied at electrodes (not shown) proximate to opposing ends of the LC cell 52, setting up an electric field within the LC cell. In the case where the LC material has a positive dielectric anisotropy, the director substantially aligns in the direction of the electric field lines, provided sufficient potential is applied across the electrodes. The director at the center of the cell is oriented perpendicular to the plane of the display in this case. The linearly polarized light entering the cell is no longer rotated through the 90° required for transmission through the analyzer. In the embodiment illustrated in FIG. 1B, the plane of polarization of the polarized light as it exits LC cell 52 (designated by arrow 53') is unchanged from its original orientation (designated by arrow 51). Hence, the light exiting the LC cell 52 is not transmitted through the analyzer 56, because the light exiting the LC cell has the wrong polarization. One method of obtaining a gray scale includes only applying sufficient electric potential to partially orient the director of the liquid crystals between the two illustrated configurations. In addition, it will be recognized that a color cell can be formed by, for example, using color filters.

Figure 1C:
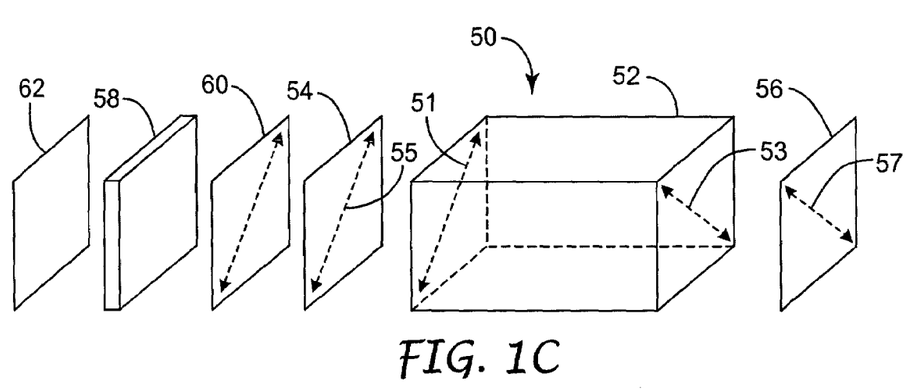
FIG. 1C is a schematic perspective view of a second embodiment of an LCD.

Typically, the polarizer 54 and analyzer 56 are constructed using absorbing sheet polarizers because these polarizers have good extinction of light having the unwanted polarization. This, however, results in substantial loss of light because the backlight generally emits unpolarized light. Light of the unwanted polarization is absorbed by the polarizer. As an alternative configuration (illustrated in FIG. 1C), a reflective polarizer 60 is placed between the polarizer 54 and the backlight 58. The reflective polarizer reflects light with the unwanted polarization back towards the backlight. The reflected light can be recycled using a reflector 62 behind the backlight where a substantial portion of the reflected light can be reused.

SUMMARY OF THE INVENTION

Generally, the present invention relates to a transflective assembly, articles containing transflective assemblies, and methods of using and making the same.

One embodiment is an assembly that includes a first reflective polarizer substantially reflecting light having a first polarization state and substantially transmitting light having a second polarization state, a polarization rotating layer positioned to receive light passing through the first reflective polarizer, and a second reflective polarizer positioned to receive light passing through the polarization rotating layer, the second reflective polarizer substantially reflecting light having a third polarization state back through the polarization rotating layer and substantially transmitting light having a fourth polarization state. Optionally, the polarization rotating layer is positioned to receive light reflected by the second reflective polarizer. The assembly can also include an absorbing polarizer, a depolarizing layer, or both. The assembly can be used in conjunction with a backlight system.

Another embodiment is another assembly that includes a first reflective polarizer substantially reflecting light having a first polarization state and substantially transmitting light having a second polarization state, a depolarizing layer positioned to receive light passing through the first reflective polarizer, the depolarizing layer converting a portion of incident light into an orthogonal polarization state, and a second reflective polarizer positioned to receive light passing through the depolarizing layer, the second reflective polarizer substantially reflecting light having a third polarization state back through the depolarizing layer and substantially transmitting light having a fourth polarization state. Optionally, the assembly can include a polarization rotating layer. The assembly can also include an absorbing polarizer. The assembly can be used in conjunction with a backlight system.

Yet another embodiment is a display that includes a liquid crystal cell that is configured and arranged to operate using polarized light; a light source; and one of the previously described assemblies disposed between the liquid crystal display cell and the light source.

Another embodiment is a method of polarizing light. The light is directed at a first reflective polarizer. The first reflective polarizer substantially reflecting light having a first polarization state and substantially transmitting light having a second polarization state. The light having a first polarization state is rotated. A second reflective polarizer receives the light that is rotated. The light reflected by the second reflective polarizer is rotated and provided to the first reflective polarizer.

The above summary of the present invention is not intended to describe each disclosed embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a method of embodying a non-inverting transflector in a roll-to-roll lamination process. Articles of the present invention generally include reflective polarizers between which is located a polarization rotator, a depolarizing layer, or both. The polarization rotator can be, for example, a polarizer, a compensation film, a Brewster-type polarizing device, or a polarizing lightguide. One embodiment of the invention involves linear reflecting polarizer films with parallel polarization axes, between which is located a polarization rotator, a depolarizing layer, or both.

The transflective displays described can also use the advantageous properties of multilayer optical films as reflective polarizers. The advantages, characteristics and manufacturing of such films are described, for example, in U.S. Pat. Nos. 5,882,774 and 5,965,247, both of which are herein incorporated by reference. The multilayer optical film is useful, for example, as mirrors or polarizers.

Multilayer optical films as reflective or absorbing polarizers as used in conjunction with the present invention exhibit relatively low absorption of incident light, as well as high reflectivity for off-axis as well as normal light rays. These properties generally hold whether the films are used for reflection or absorption of polarized light. The unique properties and advantages of the multi-layer optical film provides an opportunity to design highly efficient transflective displays. Transflective displays are described, for example, in U.S. Pat. No. 6,124,971, herein incorporated by reference.

Figure 2:
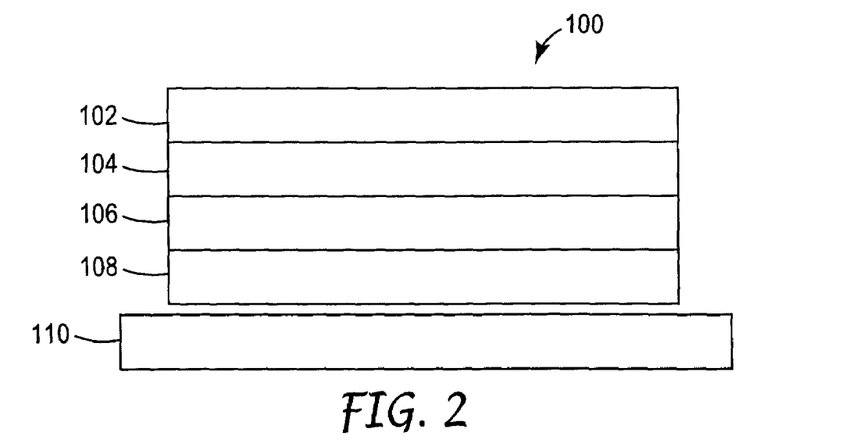
FIG. 2 is a schematic cross-sectional view of one embodiment of a transflective assembly according to the invention.

FIG. 2 is a schematic cross-sectional view of one embodiment of a transflective assembly according to the invention. The transflective assembly 100 typically includes an absorbing polarizer 102, a reflective polarizer 104, a polarization rotator 106, and a second reflective polarizer 108. The transflective assembly may be coupled to a backlighting system 110 with back reflector. In some embodiments, the transmission axes of the absorbing polarizer 102, reflective polarizer 104, and second reflective polarizer 108 are substantially parallel; however, this is not necessary to the invention. The transmission axis is the axis that permits the maximum transmission of the light. As defined herein, substantially parallel transmission axes are within 5° of each other. Optionally, a polarization rotator can be provided between the absorbing polarizer 102 and the reflective polarizer 104, particularly if the two polarizers have different polarization axes.

Figure 3:
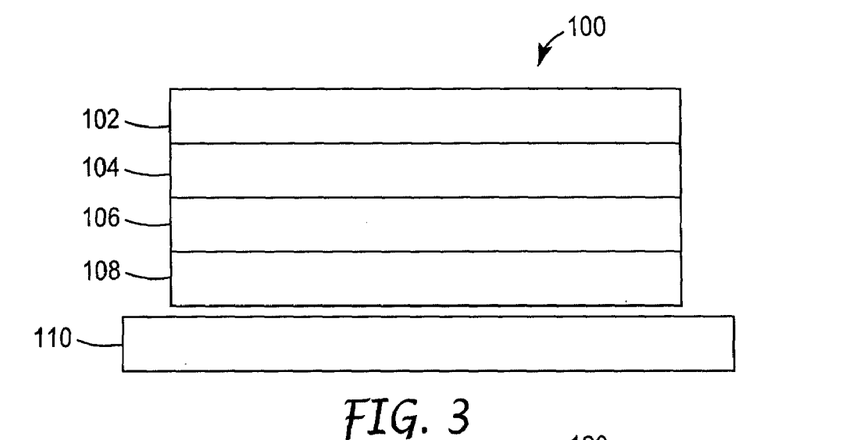
FIG. 3 is a schematic cross-sectional view of a second embodiment of a transflective assembly according to the invention.

FIG. 3 is a schematic cross-sectional view of another embodiment of a transflective assembly according to the invention. The transflective assembly 100 includes an absorbing polarizer 102, a reflective polarizer 104, a depolarizing layer 112, and a second reflective polarizer 108. The transflective assembly may be coupled to a backlighting system 110 with back reflector. The backlighting system may include any light source suitable for the particular application of the transflective assembly 100. Optionally, a polarization rotator can be provided between the absorbing polarizer 102 and the reflective polarizer 104, particularly if the two polarizers have different polarization axes.

Figure 4:
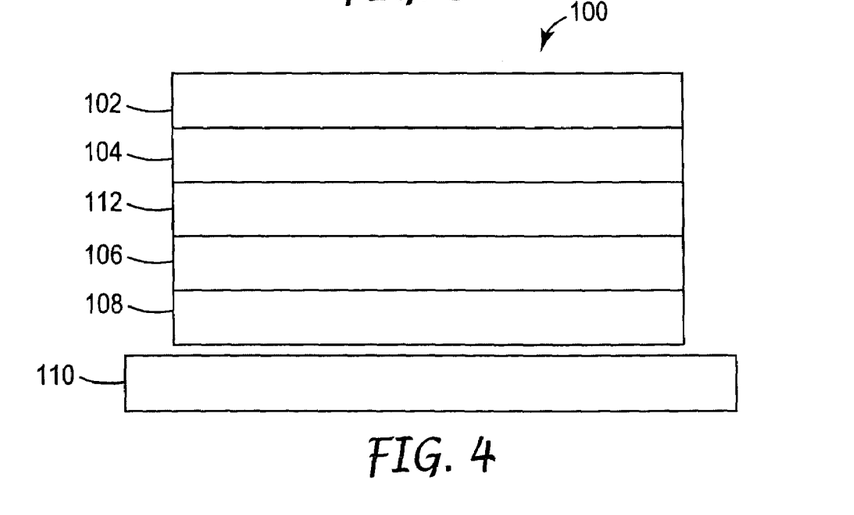
FIG. 4 is a schematic cross-sectional view of a third embodiment of a transflective assembly according to the invention.

FIG. 4 is a schematic cross-sectional view of another embodiment of a transflective assembly according to the invention. The transflective assembly 100 includes an absorbing polarizer 102, a reflective polarizer 104, a depolarizing layer 112, a polarization rotator 106, and a second reflective polarizer 108. The transflective assembly may be coupled to a backlighting system 110 with back reflector.

The backlighting system may include any light source suitable for the particular application of the transflective assembly 100. Optionally, a polarization rotator can be provided between the absorbing polarizer 102 and the reflective polarizer 104, particularly if the two polarizers have different polarization axes.

In some embodiments, in reflective mode, light having the appropriate polarization properties to pass through the absorbing polarizer 102 will also pass through the reflective polarizer 104. The polarization rotator 106 changes the overall direction of polarization of the transmitted light so that a portion of the light will be reflected by reflecting polarizer 108. Preferably, the polarization rotator 106 rotates the polarization of light by 45° or more. Light that is not reflected will enter the backlighting system 110, from which it may reflect and eventually re-enter the transflecting assembly 100. Light reflected from reflecting polarizer 108 back towards the polarization rotator 106 will have its polarization modified a second time, and some portion will pass through reflective polarizer 104 and return to the viewer. If the light is reflected from reflective polarizer 104, the process will continue. In other embodiments, light passing through the depolarizing layer 112 has its polarization reduced and a portion of the light will be reflected by reflecting polarizer 108. Light that is not reflected will enter the backlighting system 110, from which it may reflect and eventually re-enter the transflecting assembly 100. Light reflected from reflecting polarizer 108 back towards the depolarizing layer 106 will have its polarization reduced a second time, and some portion will pass through reflective polarizer 104 and return to the viewer. If the light is reflected from reflective polarizer 104, the process will continue.

Figure 5:
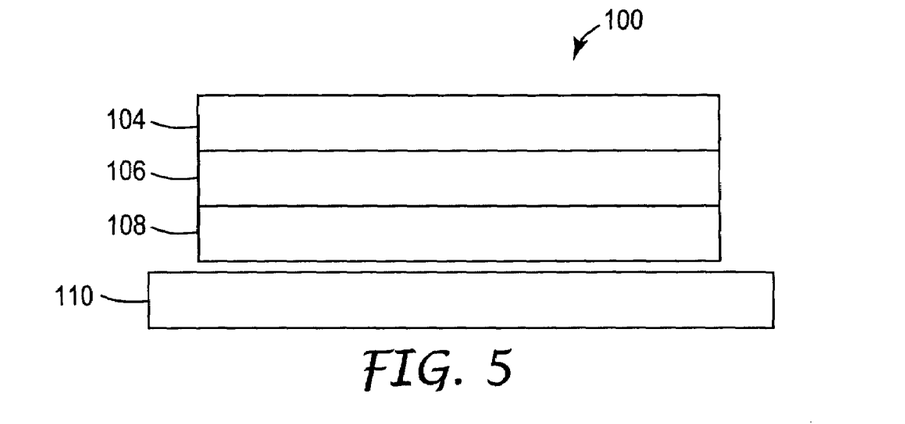
FIG. 5 is a schematic cross-sectional view of a fourth embodiment of a transflective assembly according to the invention.

FIG. 5 is a schematic cross-sectional view of yet another embodiment of a transflective assembly according to the invention wherein an absorbing polarizer 102 is not provided. The transflective assembly 100 includes a reflective polarizer 104, a polarization rotator 106, and a second reflective polarizer 108.

Figure 6:
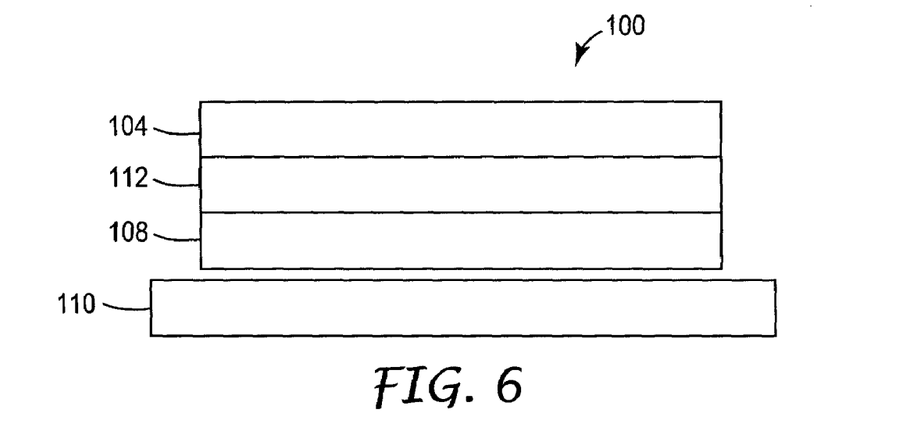
FIG. 6 is a schematic cross-sectional view of a fifth embodiment of a transflective assembly according to the invention.

FIG. 6 is a schematic cross-sectional view of yet another embodiment of a transflective assembly according to the invention wherein an absorbing polarizer 102 is not provided. The transflective assembly 100 includes a reflective polarizer 104, a depolarizing layer 112, and a second reflective polarizer 108.

One method of manufacturing embodiments of the transflective assembly 100 is through a roll to roll process. The process can be used to create a reflective polarizer/absorbing polarizer combination with parallel pass axes. The processes can be performed using roll-to-roll techniques. As an example, a film of a polarizing or polarization altering element, such as a reflective polarizer or absorbing polarizer or both, is unwound from a roll. An alignment layer is formed on the film by, for example, coating or otherwise disposing a photoalignment material onto the film, typically with a solvent or dispersant. The coating can be performed in one or more coating steps. The photoalignment material is optionally dried to at least partially (preferably, substantially or fully) remove the solvent or dispersant. The photoalignment material is cured using ultraviolet light polarized along the desired alignment direction to produce the alignment layer. The curing can be performed prior to or subsequent to the disposition of a liquid crystal material on the alignment layer, as described below. Alternatives to coating and aligning a photoalignment material to form the alignment layer include, for example, using a polarizing or polarization altering element with an aligned surface; coating or otherwise disposing an alignment layer and then stretching, rubbing, or otherwise mechanically orienting the alignment layer; or sputtering material on the film at an oblique angle to form the alignment layer.

The alignment layer is then coated with the liquid crystal material, typically with a solvent or dispersant. The coating can be performed in one or more coating steps. The liquid crystal material is optionally dried to at least partially (preferably, substantially or fully) remove the solvent or dispersant. In an alternative process, the alignment layer and liquid crystal material can be deposited simultaneously, for example, by coextrusion, on the polarizing or polarization altering element.

In addition, a substrate film, such as a TAC film or other optical film, such as a polarizer (e.g., a reflective polarizer or absorbing polarizer) or compensation film, is unwound and an alignment layer is formed on this film in the same manner. This can be done simultaneously, prior to, or subsequent to the formation of an alignment layer and liquid crystal material on the polarizing or polarization altering element. In one alternative embodiment, a liquid crystal material is also coated onto the substrate film/alignment layer construction. In yet another alternative embodiment, liquid crystal material is coated or otherwise disposed on the substrate film/alignment layer construction and not on the polarizing or polarization altering element/alignment layer construction.

The coated polarizing or polarization altering element film and the substrate film are then brought together (e.g., laminated) so that the liquid crystal material is between the two films. The liquid crystal material is cured using photoactivated, thermal, or e-beam curing to form the polarization rotator. Any photoactivated or e-beam curing is typically done through the substrate film. The final combination is then wound onto a roll. Preferably, the curing of the liquid crystal material couples the two film constructions together.

In another example, a film of a polarizing or polarization altering element, such as a reflective polarizer, is unwound from a roll. An alignment layer is formed on the film by, for example, coating a photoalignment material onto the film, typically with a solvent or dispersant. The coating can be performed in one or more coating steps. The photoalignment material is optionally dried to at least partially (preferably, substantially or fully) remove the solvent or dispersant. The photoalignment material is cured using ultraviolet light polarized along the desired alignment direction to produce the alignment layer. Alternatively, any of the other methods described in the previous example can be used.

The alignment layer is coated with the liquid crystal material, typically with a solvent or dispersant. The coating can be performed in one or more coating steps. The liquid crystal material is optionally dried to at least partially (preferably, substantially or fully) remove the solvent or dispersant. In an alternative process, the alignment layer and liquid crystal material can be deposited simultaneously, for example, by coextrusion, on the polarizing or polarization altering element.

Optionally, a second alignment layer is coated or otherwise disposed onto the liquid crystal material, typically with a solvent or dispersant. A second alignment layer preferably may not be needed if the desired twist angle or retardation can be provided by the liquid crystal material. If the second alignment layer is used, the second alignment layer is optionally dried to at least partially (preferably, substantially or fully) remove the solvent or dispersant. In one embodiment, the second alignment layer includes a photoalignment material that is cured using ultraviolet light polarized along the desired alignment direction. In other embodiments, the second alignment layer is formed by, for example, disposing a polarizing or polarization altering element with an aligned surface on the liquid crystal material; coating or otherwise disposing a second alignment layer on the liquid crystal material and then stretching, rubbing, or otherwise mechanically orienting the second alignment layer; or sputtering material on the liquid crystal material at an oblique angle to form the second alignment layer.

The liquid crystal material is cured using photoactivated, thermal, or e-beam curing. Any photoactivated or e-beam curing is typically done through the second alignment layer to form the polarization rotator. This curing can occur simultaneously with the second alignment layer (or even with the first alignment layer or both alignment layers) or subsequent to the curing of the second alignment layer. The final combination is then wound onto a roll.

Figure 7:
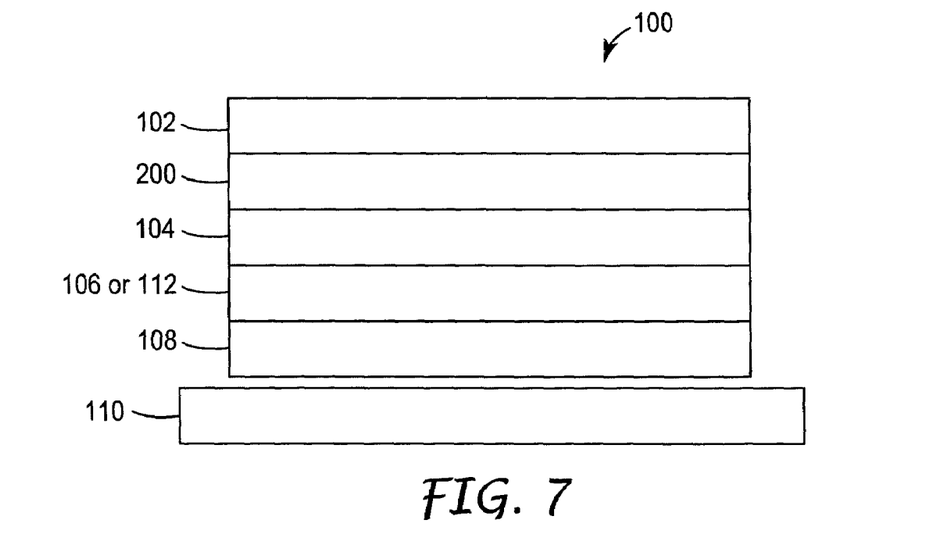
FIG. 7 is a schematic cross-sectional view of a sixth embodiment of a transflective assembly according to the invention.

FIG. 7 is a schematic cross-sectional view of another embodiment of a transflective assembly according to the invention. In an embodiment of the transflective assembly 100, the first reflective polarizer 104 and second reflective polarizer 108 have non-parallel transmission axes, particularly if the polarizers are not of identical construction. A polarization rotator 200 is sandwiched between absorbing polarizer 102 and reflective polarizer 104 if the absorbing polarizer 102 has a transmission axis not parallel with that of reflective polarizer 104. In some embodiments, absorbing polarizer 102 and polarization rotator 200 are constructed as a single film and laminated to the display, and the rest of the transflective assembly 100 is assembled separately. As discussed above, in other embodiments an absorbing polarizer 102 is not used.

The polarization rotator is typically formed using a birefringent material. Examples of suitable birefringent materials include oriented polymer films, laminated structures of oriented polymer films, and both organic and inorganic multilayer birefringent coatings. Other examples include any liquid crystal material that has a director that can be controlled. A nematic liquid crystal is generally composed of rodlike molecules with their long axes aligned approximately parallel to one another. At any point in the medium one can define a vector to represent the preferred orientation in the immediate neighborhood of the point. This vector is commonly called the director. Suitable liquid crystal (LC) materials include, for example, lyotropic, nematic, and cholesteric liquid crystal materials. Examples include E7, BL036, 5CB, and RM257 from Merck; C6M, 76, 296, 495, and 716, from Koninklijke Philips Electronics N.V. (Amsterdam, the Netherlands); Paliocolor LC242 and Paliocolor CM649 from BASF AG (Ludwigshafen, Germany); and LCP-CB483 from Vantico AG (Luxembourg). Additional examples of suitable materials include those described in U.S. Pat. Nos. 5,793,455, 5,978,055, and 5,206,752, all of which are incorporated herein by reference. The LC materials can be polymeric or monomeric materials. Suitable monomeric materials also include those materials that can be reacted to form polymeric liquid crystal materials.

For some embodiments, a twisted nematic LC structure is preferred. In these embodiments, the director exhibits a uniform helical twist about the normal to the surface of the polarization rotator. The twist angle and initial orientation can be selected by the use of one or more optional alignment layers.

In another embodiment, the axis about which the local director of a LC structure twists or rotates is not normal to the surface of the substrate upon which the LC material is disposed. In this embodiment, the nematic director lies out of the plane of the polarizer or polarization-altering element. With respect to the surface of the substrate, the angle of the axis, at which the local director lies or about which the local director twists, is defined as the pretilt angle, $\alpha$. The pitch can be constant or can vary (e.g., increase or decrease) along the axis. The twist angle and orientation can be selected by the use of one or more optional alignment layers.

At least some liquid crystal materials, such as chiral nematic (e.g., cholesteric) liquid crystals, include a chiral component which results in the formation of a structure where the director of the liquid crystal material naturally rotates about an axis perpendicular to the director. The pitch of the chiral nematic liquid crystal corresponds to the thickness of material needed to achieve a 360° rotation of the director. At least some achiral nematic liquid crystals can be made chiral by the addition of a chiral compound. The pitch of the material can be modified by changing the ratio of chiral to achiral components.

A uniaxial birefringent material, such as a nematic liquid crystal, is characterized by two principal refractive indices, $n_o$ and $n_e$. The ordinary refractive index, $n_o$, influences that component of light whose electric field polarization vector is perpendicular to the optical symmetry axis of the birefringent medium. The extraordinary index, $n_e$, influences that component of light whose electric field polarization vector is parallel to the optical symmetry axis of the birefringent medium (for example, parallel to the director in the case of a nematic LC material with positive dielectric anisotropy).

The birefringence, $\Delta n$, of the medium can be defined in terms of $n_o$ and $n_e$:

$$\Delta n = n_e - n_o.$$

Polarized light incident on a birefringent medium will propagate as an ordinary ray component and an extraordinary ray component. The phase velocity of each component will differ, as each experiences a different index of refraction. The total change in phase, or retardation, of the light depends upon the birefringence and the thickness of the medium.

One embodiment of a suitable polarization rotator corresponds to a layer having the thickness of a half wave retarder and an optical axis that is set off from the plane of polarization of incident linearly polarized light by an azimuthal angle, $\phi$. The optical axis of the polarization rotator is in a plane parallel to the "extraordinary" ray and perpendicular to the "ordinary" ray. The half wave retarder rotates the polarization of the incident linearly polarized light by $2\phi$. For example, a 45° polarization rotator has an optical axis that is set off from the polarization direction of incident linearly polarized light by 22.5°. The term "half wave retarder" signifies that the polarization rotator has a thickness, d, with $\Delta n d = (2m+1)\lambda/2$, where $\lambda$ is the wavelength of light, and m is an integer, 0, 1, 2, . . . . For other wavelengths of light, the polarization rotator may provide different rotational values. This embodiment functions as a perfect rotator only for wavelengths that satisfy the aforementioned requirement.

As yet another example, a polarization rotator can be a formed using a liquid crystal material whose director rotates along the thickness axis of the polarization rotator by a twist angle, $\Phi$, which is much smaller than a phase retardation, $\Gamma$, of the polarization rotator. The phase retardation is given by:

$$\Gamma = 2\pi \Delta n d / \lambda.$$

When $\Phi \ll \Gamma$ for a particular wavelength or wavelength range of light, linearly polarize incident at one side of the polarization rotator will emerge rotated by the same amount as the twist angle, Φ, for that wavelength of light. This effect can be achieved when the polarization rotator includes liquid crystal material having a twisted nematic structure. A twisted nematic structure can be achieved using chiral nematic liquid crystal material or using optional alignment layers on opposing sides of the polarization rotator (as illustrated, for example, in FIG. 3) where the alignment between the two layers differs by the desired twist angle, or a combination of these methods.

Polarization rotators can also be designed to utilize both the twist angle and retardation to alter the polarization and ellipticity of incident light. As an example, consider an input beam of linearly polarized light with its electric field vector parallel to the director of a twisted nematic structure. According to the Jones matrix methods (see, for example, "Optics of Liquid Crystal Displays", by Pochi Yeh and Claire Gu, John Wiley and Sons, 1999), the output light has ellipticity and azimuth orientation given by:

$$e = \tan\left(\frac{1}{2}\sin^{-1}\left[\frac{\Gamma\phi}{X^2}\sin^2 X\right]\right)$$

$$\tan 2\psi = \frac{2\phi X \tan X}{\left(\phi^2 - \frac{\Gamma^2}{4}\right)\tan^2 X - X^2}$$

where ψ is the angle of the major axis of the polarization ellipse measured from the local director axis at the exit plane. Here, φ is the twist angle of the TN structure, Γ is the phase retardation as defined above, and:

$$X = \sqrt{\phi^2 + \left(\frac{\Gamma}{2}\right)^2}.$$

For example, for 550 nm light, a polarization rotator having a birefringence of 0.12, a thickness of 1.62 μm, and a twist angle of 64° can alter the polarization of linearly polarized light to light with ellipticity of −1.

The polarization rotator can be formed using one or more different layers (e.g., coatings) of material. For example, multiple layers of material can be deposited on a particular substrate or polarizer with optional solvent removal steps and, optionally, partial or full curing between deposition of the layers. This can be particularly useful if the particular substrate or polarizer is sensitive to temperature, humidity, or both. Multiple applications of material can reduce the temperature or time needed to drive away the solvent or cure the material. As another example, layers of material for the polarization rotator can be formed on different substrates or polarizers and then the two layers brought together. This provides a method for combining (e.g., laminating) individual components into a single article. Optionally, an annealing step at elevated temperature can be performed to facilitate diffusion, coupling, or alignment between two or more layers of polarization rotator material.

A liquid crystal material can be selected which includes reactive functional groups that can be used to crosslink the material. Alternatively, a crosslinking or vitrifying agent can be included with the liquid crystal material in the composition used to form the polarization rotator. The liquid crystal material can be aligned as desired (for example, in a nematic, twisted nematic, or chiral nematic phase) and then crosslinked or otherwise vitrified to retain the alignment. Such crosslinking can be performed by a variety of processes including, for example, by photoinitiated, electron-beam, or thermal curing.

Other materials can be included in the polarization rotator or the composition used to form the polarization rotator. For example, a diffusing or scattering material can be included to cause the diffusion or scattering of light, if desired, by the polarization rotator. As another example, an absorbing material can be included to absorb light of a particular wavelength if, for example, a colored appearance or the removal of a colored appearance is desired. Examples of suitable absorbing materials include, for example, dyes and pigments. In some embodiments, a dichroic dye material (e.g., a material that preferentially absorbs light of one polarization) is used. In particular, a dichroic dye material can be desirable if the dichroic dye material is capable of being aligned within the polarization rotator. Suitable dichroic dye materials include, for example, iodine, as well as anthraquinone, azo, diazo, triazo, tetraazo, pentaazo, and mericyanine dyes, Congo Red (sodium diphenyl-bis-α-naphthylamine sulfonate), methylene blue, stilbene dye (Color Index (CI)=620), 1,1'-diethyl-2,2'-cyanine chloride (CI=374 (orange) or CI=518 (blue)), 2-phenylazothiazole, 2-phenylazobenzthiazole, 4,4'-bis(arylazo)stilbenes, perylene compounds, 4-8-dihydroxyanthraquinones optionally with 2-phenyl or 2-methoxyphenyl substituents, 4,8-diamino-1,5-naphthaquinone dyes, and polyester dyes such as Palanil™ blue BGS and BG (BASF AG, Ludwigshafen, Germany). The properties of these dyes, and methods of making them, are described in E. H. Land, Colloid Chemistry (1946), incorporated herein by reference. Still other dichroic dyes, and methods of making them, are discussed in the Kirk Othmer Encyclopedia of Chemical Technology, Vol. 8, pp. 652–661 (4th Ed. 1993), and in the references cited therein, all of which are incorporated herein by reference.

Other additives include, for example, oils, plasticizers, antioxidants, antiozonants, UV stabilizers, curing agents, and crosslinking agents. These additives can be reactive with the liquid crystal material or non-reactive.

In one embodiment, a polarization rotator/polarizer is formed using a twisted nematic structure of a liquid crystal material that also includes absorbing molecules that are oriented with the liquid crystal material. In one example, the absorbing molecules align with the direction of the liquid crystal material. Light having a polarization parallel to the director of the liquid crystal material is absorbed and light having a polarization perpendicular to the liquid crystal material is transmitted. This embodiment of a polarization rotator also acts as a polarizer. This particular polarization rotator can be, for example, a "clean-up" polarizer positioned after a reflective polarizer to enhance the extinction of light of the unwanted polarization state.

The optical properties, including indices of refraction, of any material used in the polarization rotator can be wavelength dependent. For example, a thickness corresponding to a half wave retarder for one wavelength may generate less than a half wave retardation for a second wavelength. In at least some embodiments, particularly display applications, it is desirable to reduce or minimize variation over a wavelength range, for example, over the visible spectrum of light (e.g., wavelengths from about 380 to about 800 nm). One method of reducing the wavelength dependence (i.e., decreasing the chromaticity) of the polarization rotator includes the formation of two or more separate layers using different materials and aligning the two layers so that the optical axes of the layers are crossed at a particular angle.

For example, the optical axes of the layers can be crossed at 90° to each other. The materials are selected to obtain a polarization rotator in which $\Delta nd/\lambda$ is substantially constant (e.g., varying by no more than 10% or 5%) for a desired wavelength range. For example, a layer of polypropylene can be laid crosswise over a layer of polycarbonate (or vice versa) to obtain an element with substantially uniform optical retardation over the entire range of visible light wavelengths. Preferably, the difference between the wavelength dependence of the optical distance through the layer for the two films is substantially uniform over the wavelength range of interest. The relative thickness of each of the films can be adjusted to modify the wavelength dependence of the composite of the films.

Alignment layers can optionally be used with the polarization rotator to define the optical axis at surfaces of the polarization rotator. This optical axis can be at an angle parallel to the surface of the alignment layer. In addition, in at least some instances, a tilt angle away from the surface of the alignment layer can be defined by the alignment layers. Alignment layers are particularly useful with liquid crystal materials to define the alignment of the director of the liquid crystal at the surfaces of the polarization rotator. Alignment layers can be provided on opposing surfaces of the liquid crystal material (e.g., a polarization rotator). One alternative includes using a single alignment layer and relying on the pitch and thickness of the polarization rotator to determine the alignment at the opposing surface.

Alignment layers can be separately formed layers or can be part of one or more of the other optical components of the film. For example, the polarizer can also act as an alignment layer. Optionally, the liquid crystal material can be crosslinked after alignment to maintain the alignment. Optionally, one or more of the alignment layers can be removed from the device after crosslinking or vitrifying the LC material.

A variety of methods are known for the preparation of alignment layers because alignment layers have been used in other components including in LC cells. Generally, one group of known techniques for making alignment layers involves mechanical or physical alignment, and a second group involves chemical and photoalignment techniques.

One commonly used mechanical method of making an alignment layer includes rubbing a polymer layer (e.g., poly(vinyl alcohol) or polyimide) in the desired alignment direction. Another physical method includes stretching or otherwise orienting a polymer film, such as a poly(vinyl alcohol) film, in the alignment direction. Any number of oriented polymer films exhibit alignment characteristics for LC materials, including polyolefins (such as polypropylenes), polyesters (such as polyethylene terephthalate and polyethylene naphthalate), and polystyrenes (such as atactic-, isotactic-, or syndiotactic-polystyrene). The polymer can be a homopolymer or a copolymer and can be a mixture of two or more polymers. The polymer film acting as an alignment layer can include one or more layers. Optionally, the oriented polymer film acting as an alignment layer can include a continuous phase and a dispersed phase. Yet another physical method includes obliquely sputtering a material, such as $SiO_x$, $TiO_2$, $MgF_2$, $ZnO_2$, Au, and Al, onto a surface in the alignment direction. Another mechanical method involves the use of microgrooved surfaces, such as that described in U.S. Pat. Nos. 4,521,080, 5,946,064, and 6,153,272, all of which are incorporated herein by reference.

An alignment layer can also be formed photochemically. Photo-orientable polymers can be formed into alignment layers by irradiation of anisotropically absorbing molecules disposed in a medium or on a substrate with light (e.g., ultraviolet light) that is linearly polarized in the desired alignment direction (or in some instances perpendicular to the desire alignment direction), as described, for example, in U.S. Pat. Nos. 4,974,941, 5,032,009, and 5,958,293, all of which are incorporated by reference. Suitable photo-orientable polymers include polyimides, for example polyimides comprising substituted 1,4-benzenediamines.

Another class of photoalignment materials, which are typically polymers, can be used to form alignment layers. These polymers selectively react in the presence of polarized ultraviolet light along or perpendicular to the direction of the electric field vector of the polarized ultraviolet light, which once reacted, have been shown to align LC materials. Examples of these materials are described in U.S. Pat. Nos. 5,389,698, 5,602,661, and 5,838,407, all of which are incorporated herein by reference. Suitable photopolymerizable materials include polyvinyl cinnamate and other polymers such as those disclosed in U.S. Pat. Nos. 5,389,698, 5,602, 661, and 5,838,407. Photoisomerizable compounds, such as azobenzene derivatives are also suitable for photoalignment, as described in U.S. Pat. Nos. 6,001,277 and 6,061,113, both of which are incorporated herein by reference.

Additionally, some lyotropic liquid crystal materials can also be used as alignment layers. Such materials, when shear-coated onto a substrate, strongly align thermotropic LC materials. Examples of suitable materials are described in, for example, U.S. patent application Ser. No. 09/708,752, incorporated herein by reference.

As an alternative to alignment layers, the liquid crystal material of the polarization rotator can be aligned using an electric or magnetic field. Yet another method of aligning the liquid crystal material is through shear or elongational flow fields, such as in a coating or extrusion process. The liquid crystal material may then be crosslinked or vitrified to maintain that alignment. Alternatively, coating the liquid crystal material on an aligned substrate, such as oriented polyesters like polyethylene terephthalate or polyethylene naphthalate, can also provide alignment.

The polarization rotator 106 or depolarizing layer 112 can be formed using any material or construction, preferably suitable to web-based processing, that is capable of affecting the polarization state of light. The depolarizing layer 112 can be a diffuse layer, such as a diffuse adhesive layer, that somewhat scrambles the polarization. The depolarizing layer 112 may be an elliptical depolarizer using pre-tilt. Roughened, structured, or prismatic surfaces can also be used as the depolarizing layer 112. The depolarizing layer 112 may include a polymer matrix containing particles that deflect light. The depolarizing layer 112 preferably does not absorb light within the desired depolarization wavelength range to any significant degree (e.g., absorbance is no more than about 1%, 5%, or 10%).

The optical properties of the depolarizing layer 112 are determined by the selection or manipulation of various parameters, including the optical indices of particles, the size and shape of the particles, the volume fraction of the particles, and the thickness of the depolarizing layer 112.

The magnitude of the index match or mismatch along a particular axis between the material (e.g., particles and polymer matrix) of the depolarizing layer will directly affect the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

The size of the particles can have a significant effect on scattering. If the particles are too small (e.g., less than about 1/30 the wavelength of light in the medium of interest) and if there are many particles per cubic wavelength, the depolarizing layer behaves as a medium with an effective index of refraction somewhat between the indices of the two phases along any given axis. In such a case, very little light is scattered. If the particles are too large, the light is specularly reflected from the particle surface, with very little diffusion into other directions. When the particles are too large in at least two orthogonal directions, undesirable iridescence effects can also occur. Practical limits may also be reached when particles become large in that the thickness of the depolarizing layer becomes greater and desirable mechanical properties are compromised.

The shape of the particles can also have an effect on the scattering of light. The depolarizing factors of the particles for the electric field can reduce or enhance the amount of scattering in a given direction. The effect can either add or detract from the amount of scattering from the index mismatch.

The shape of the particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger.

One method of forming the depolarizing layer is as a film by dispersing fine particles in a resin. The fine particles composed of polymer beads, etc. are fixed in the resin (for example, a polymer matrix), of which the refractive index is different from that of the fine particles. The refractive index and the size of the fine particles are in the range of from 1.0 to 1.9 and from 1 to 10 µm, respectively. For example, the resin may be a photosensitive acrylic resin having a refractive index of 1.5. The material obtained by dispersing the fine particles in the photosensitive resin is applied to the first substrate and then subjected to ultraviolet radiation while being pressed. The optical scattering layer which has a planar surface is thereby formed.

The absorbing polarizer 102, reflective polarizer 104, or second reflecting polarizer 108 may have a variety of constructions. Reflective polarizers can take a variety of forms. Suitable reflective polarizers include those which have two or more different materials of differing refractive index in alternating layers or as a dispersed phase within a continuous phase. Polymeric multilayer reflective polarizers are described in, for example, U.S. Pat. Nos. 5,882,774 and 5,965,247 and PCT Publication Nos. WO95/17303; WO95/17691; WO95/17692; WO95/17699; WO96/19347; and WO99/36262, all of which are incorporated herein by reference. One commercially available form of a multilayer reflective polarizer is marketed as Dual Brightness Enhanced Film (DBEF) by 3M, St. Paul, Minn. Inorganic multilayer reflective polarizers are described in, for example, H. A. Macleod, *Thin-Film Optical Filters, 2nd Ed.*, Macmillan Publishing Co. (1986) and A. Thelan, *Design of Optical Interference Filters*, McGraw-Hill, Inc. (1989), both of which are incorporated herein by reference. Diffuse reflective polarizers include the continuous/disperse phase reflective polarizers described in U.S. Pat. No. 5,825,543, incorporated herein by reference, as well as the diffusely reflecting multilayer polarizers described in U.S. Pat. No. 5,867,316, incorporated herein by reference. Other reflective polarizers are described in U.S. Pat. Nos. 5,751,388 and 5,940,211, both of which are incorporated herein by reference.

Another example of a reflective polarizer is formed using cholesteric liquid crystal material. The cholesteric liquid crystal polarizer transmits right-or left-handed circularly polarized light at a wavelength corresponding to the optical length of the pitch of the cholesteric liquid crystal. The light that is not transmitted is reflected and is circularly polarized in the opposite helicity. Cholesteric liquid crystal reflective polarizers are described in, for example, U.S. Pat. No. 5,793,456, U.S. Pat. No. 5,506,704, U.S. Pat. No. 5,691,789, and European Patent Application Publication No. EP 940 705, all of which are incorporated herein by reference. As the LCD requires the input of linearly polarized light, cholesteric reflective polarizers are typically provided with a quarter wave retarder to convert the transmitted circularly polarized light into linearly polarized light. Suitable cholesteric reflective polarizers are marketed under the tradename TRANSMAX™ by Merck and Company, Incorporated and NIPOCS™ by Nitto Denko Corporation.

Another type of polarizer is an absorbing polarizer. These polarizers are typically made of a material that is oriented and absorbs light of a particular polarization. Examples of such polarizers include oriented polymer layers that are stained with a dichroic dye material, such as iodine or metal chelates. Examples of such constructions include a stretched poly(vinyl alcohol) layer that is stained with iodine. A discussion of suitable absorbing polarizers can be found in, for example, U.S. Pat. Nos. 4,166,871, 4,133,775, 4,591,512, and 6,096,375, which are all herein incorporated by reference.

Another type of absorbing polarizer includes an oriented polymer, optionally made without additional dyes or stains, which includes segments, blocks, or grafts of polymeric material that selectively absorb light. One example of absorbing polarizer made without stains or dyes is an oriented copolymer that includes poly(vinyl alcohol) and polyvinylene blocks, where the polyvinylene blocks are formed by molecular dehydration of poly(vinyl alcohol). A discussion of polarizers made without dyes or stains can be found in, for example, U.S. Pat. Nos. 3,914,017 and 5,666,223, both of which are herein incorporated by reference.

Oriented polymer films of the above-described absorbing polarizers can also act as an alignment layer for the polarization rotator, if desired. In one embodiment, an oriented poly(vinyl alcohol) absorbing polarizer is provided over a reflective polarizer (see, for example, U.S. Pat. No. 6,096,375). The oriented poly(vinyl alcohol) absorbing polarizer optionally acts as an alignment layer for a polarization rotator formed using liquid crystal material disposed on the absorbing polarizer.

As indicated above, in place of the polarizer (element 202 as illustrated in FIG. 3), another polarization-altering element can be used. Such polarization-altering elements include, for example, compensation films. These films alter the polarization of light to provide a different elliptical or circular polarization. This can provide a wider horizontal viewing angle, vertical viewing angle, or both for a display.

The film can have more than one polarizer or other polarization-altering element. For example, a polarization rotator can be disposed between two polarizers. Moreover, the film can include more than one polarization rotator. In addition, other optical components can be included in the film, including, for example, microstructured prism films (such as described in, for example, U.S. Pat. Nos. 5,932,626 and 6,044,196, both of which are incorporated herein by reference), diffusion layers, scattering layers, and selective wavelength absorbing and transmitting layers. Other layers can be incorporated into the film which do not substantially alter the optical properties of the article including, for example, adhesive layers and substrates.

A variety of different articles can be constructed. These articles can be constructed in a number of different ways. In addition to the methods described herein, additional examples of methods of making the articles and methods of making polarization rotators and examples of polarization rotators are described in the copending U.S. patent application Ser. No. 09/965417, entitled "Methods of Making Polarization Rotators and Articles Containing the Polarization Rotators", Docket No. 56233US002, filed on Sep. 27, 2001 and incorporated herein by reference. In particular, any of the individual elements of the article can be generated separately, sequentially, or simultaneously. For example, two or more of the elements (e.g., a reflective polarizer and the polarization rotator or depolarizing layer) can be coextruded or can be simultaneously coated onto an optionally removable substrate. As another example, an element (e.g., the polarization rotator) can be coated or otherwise disposed onto a previously formed layer (e.g., a polarizer). Alternatively, the individual elements can be formed separately and laminated together. A film can be formed using any combination of these methods. For example, a reflective polarizer and a polarization rotator can be coextruded; a reflective polarizer can be coated onto a polarization rotator; or a reflective polarizer can be laminated to a polarization rotator to form the article.

The elements of the article can be integrated together to form the article by a variety of methods which will typically depend on factors such as, for example, the types of layers to be integrated together, the method of forming the individual elements, and the materials of the elements. It will be understood that several different methods can be used for a single film (e.g., one polarizer and the polarization rotator may be coextruded and then another polarizer laminated thereon). Methods of integrating elements include, for example, coextrusion, coating, adhesive lamination, heat lamination, diffusion at elevated temperatures, reactive coupling between reactive groups on the two layers, and crosslinking. When an adhesive is used, the adhesive is preferably optically transparent over the wavelength range of interest, unless the adhesive is also used as an optical layer within the film.

Figure 8:
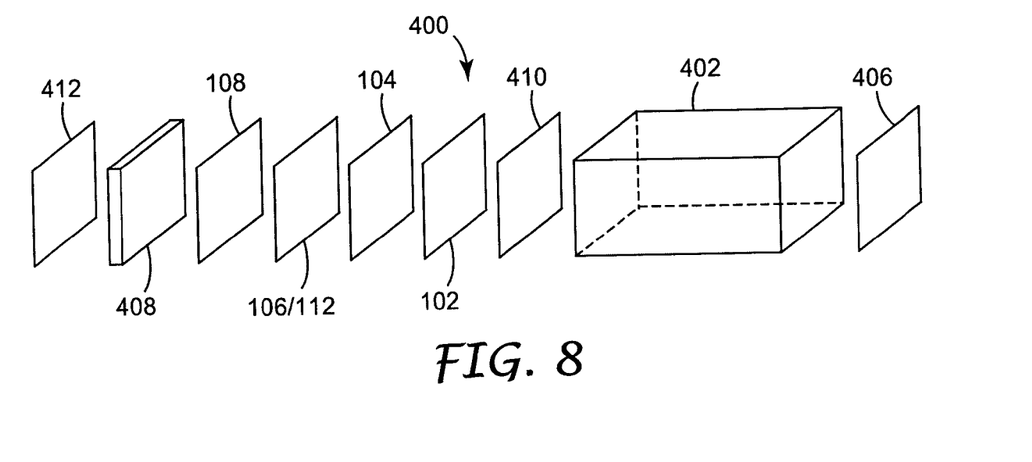
FIG. 8 is a schematic perspective view of one embodiment of an LCD, according to the invention.
Figure 9:
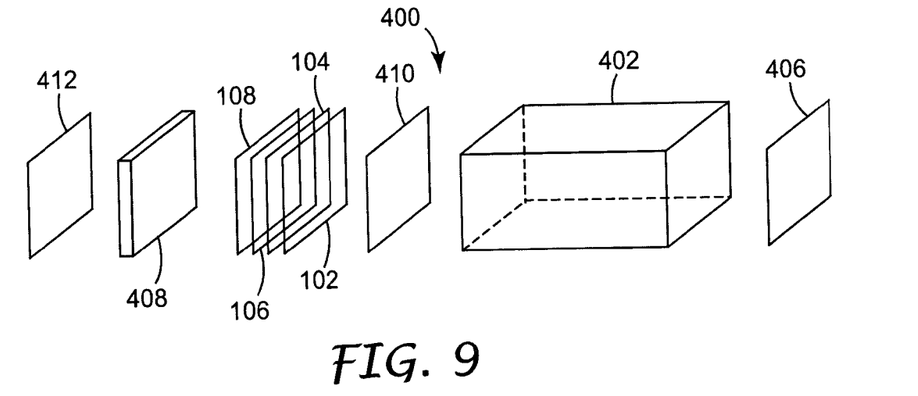
FIG. 9 is a schematic perspective view of another embodiment of an LCD, according to the invention.

The transflective assembly 100 can be used in a variety of applications including an LCD and other electronic displays, including cell phone and PDA (personal digital assistants) applications. One preferred application is a WNI (white non-inverting) transflector. FIG. 8 illustrates one embodiment of an LCD. It will be recognized that other LCD configurations are known and that the transflective assembly 100 can be used in those display configurations. The configuration of FIG. 8 is provided as an example to illustrate the use of the transflective assembly 100. Am LCD 400 includes an LC cell 402, an optional polarizer 410, an absorbing polarizer 102, a reflective polarizer 104, a polarization rotator 106 or a depolarizing layer 112 or both, a second reflective polarizer 108, an analyzer 406, a backlight 408, and a reflector 412. FIG. 9 illustrates another embodiment of an LCD. The LCD 400 includes an LC cell 402, an optional polarizer 410, a single film transflective assembly 100, an analyzer 406, a backlight 408, and a reflector 412. The transflective assembly 100 includes an absorbing polarizer 102, a reflective polarizer 104, a polarization rotator 106 or depolarizing layer 112, and a second reflective polarizer 108.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A display, comprising:
    a liquid crystal cell that is configured and arranged to operate using polarized light;
    a first reflective polarizer substantially reflecting light having a first polarization state and substantially transmitting light having a second polarization state;
    a polarization rotating layer positioned to receive light passing through the first reflective polarizer; and
    a second reflective polarizer positioned to receive light passing through the polarization rotating layer, the second reflective polarizer substantially reflecting light having a third polarization state back through the polarization rotating layer and substantially transmitting light having a fourth polarization state.

2. The display of claim 1, wherein the polarization rotating layer is positioned to rotate light reflected by the second reflective polarizer.

3. The display of claim 1, further comprising a depolarizing layer disposed between the first and second reflective polarizers, the depolarizing layer converting a portion of incident light into an orthogonal polarization state, wherein the second reflective polarizer is positioned to receive light passing through the polarization rotating layer and the depolarizing layer.

4. The display of claim 1, further comprising a backlight system positioned to receive light from the second reflective polarizer, the backlight system comprising a reflector.

5. The display of claim 1, wherein a transmission axis of the first reflective polarizer is substantially aligned with a transmission axis of the second reflective polarizer.

6. The display of claim 1, further comprising an absorbing polarizer positioned to receive light from an external light source, the absorbing polarizer substantially absorbing light having a fifth polarization state and substantially transmitting light having a sixth polarization state.

7. The display of claim 6, wherein a transmission axis of the absorbing polarizer is substantially aligned with a transmission axis of the first reflective polarizer.

8. The display of claim 7, wherein a transmission axis of the first reflective polarizer is substantially aligned with a transmission axis of the second reflective polarizer.

9. The display of claim 6, wherein a transmission axis of the first reflective polarizer is not substantially aligned with a transmission axis of the absorbing polarizer, the assembly further comprising a second polarization rotator disposed between the first reflective polarizer and the absorbing polarizer.

10. The display of claim 1, wherein the first reflective polarizer is coupled to the polarization rotating layer.

11. The display of claim 10, wherein the polarization rotating layer is coupled to the second reflective polarizer.

12. The display of claim 1, wherein the polarization rotating layer is a liquid crystal polymer polarization rotator or a half-wave plate.

13. A display, comprising:
- a liquid crystal cell that is configured and arranged to operate using polarized light;
- a first reflective polarizer substantially reflecting light having a first polarization state and substantially transmitting light having a second polarization state;
- a depolarizing layer positioned to receive light passing through the first reflective polarizer, the depolarizing layer converting a portion of incident light into an orthogonal polarization state; and
- a second reflective polarizer positioned to receive light passing through the depolarizing layer, the second reflective polarizer substantially reflecting light having a third polarization state back through the depolarizing layer and substantially transmitting light having a fourth polarization state.

14. The assembly of claim 13, further comprising a backlight system positioned to receive light from the second reflective polarizer, the backlight system comprising a reflector.

15. The assembly of claim 13, wherein a transmission axis of the first reflective polarizer is substantially aligned with a transmission axis of the second reflective polarizer.

16. The assembly of claim 13, further comprising an absorbing polarizer positioned to receive light from an external light source, the absorbing polarizer absorbing light having a fifth polarization state and transmitting light having a sixth polarization state.

17. The assembly of claim 16, wherein a transmission axis of the absorbing polarizer is substantially aligned with a transmission axis of the first reflective polarizer.

18. The assembly of claim 17, wherein the transmission axis of the first reflective polarizer is substantially aligned with a transmission axis of the second reflective polarizer.

19. The assembly of claim 16, wherein a transmission axis of the first reflective polarizer is not substantially aligned with a transmission axis of the absorbing polarizer, the assembly farther comprising a polarization rotator disposed between the first reflective polarizer and the absorbing polarizer.

20. The assembly of claim 13, wherein the first reflective polarizer is coupled to the depolarizing layer.

21. The assembly of claim 20, wherein the depolarizing layer is coupled to the second reflective polarizer.

22. The assembly of claim 13, wherein the depolarizing layer is a diffuse adhesive layer.

23. The assembly of claim 13, wherein a surface of the depolarizing layer is roughened.

* * * * *

UNITED STATES PATENT AND TRADEMARK OFFICE
CERTIFICATE OF CORRECTION

| | |
|---|---|
| PATENT NO. | : 7,084,938 B2 |
| APPLICATION NO. | : 10/919707 |
| DATED | : August 1, 2006 |
| INVENTOR(S) | : Philip E. Watson |

It is certified that error appears in the above-identified patent and that said Letters Patent is hereby corrected as shown below:

Column 8,
Line 66, Delete "polarize" and insert -- polarized light --, therefor.

Column 15,
Line 58, Delete "Am" and insert -- An --, therefor.

Column 18,
Line 13, In Claim 19, delete "farther" and insert -- further --, therefor.

Signed and Sealed this

Nineteenth Day of December, 2006

JON W. DUDAS
*Director of the United States Patent and Trademark Office*